United States Patent [19]
Clark

[11] Patent Number: 5,346,427
[45] Date of Patent: Sep. 13, 1994

[54] APPARATUS AND METHOD FOR REMOVING TURKEY VISCERA

[76] Inventor: Stevie Clark, 1120 Diehl St., Raeford, N.C. 28376

[21] Appl. No.: 112,560

[22] Filed: Aug. 26, 1993

[51] Int. Cl.$^5$ ............................................ A22C 21/06
[52] U.S. Cl. ...................................... 452/118; 452/117
[58] Field of Search ............... 452/118, 109, 117, 116, 452/106

[56] References Cited

U.S. PATENT DOCUMENTS

| | | | |
|---|---|---|---|
| 2,975,469 | 3/1961 | Viscolosi | 452/118 |
| 5,279,517 | 1/1994 | Koops | 452/118 |

*Primary Examiner*—Willis Little
*Attorney, Agent, or Firm*—Kennedy & Kennedy

[57] ABSTRACT

An apparatus for removing viscera from a poultry carcass carried substantially horizontally on a first conveyor. A frame supports a pair of continuous second conveyors attached to sprockets. The second conveyors are driven in synchronization with the travel of the first conveyor. A plurality of spoon modules attach in spaced-apart relation to the pair of second conveyors. Each spoon module comprises a pair of blocks attached to a separate one of the second conveyors with the pair being transversely aligned. A pair of spaced-apart rods connect between the blocks and slidably receives a plate for transverse travel between the pair of conveyors. A spoon including a cam wheel pivotally connects to the plate. The cam wheel follows a cam track in a V-shaped path for extending and retracting the spoon to remove viscera from the poultry carcass.

13 Claims, 7 Drawing Sheets

APPARATUS AND METHOD FOR REMOVING TURKEY VISCERA

TECHNICAL FIELD

The present invention relates to poultry processing equipment. More particularly described, the present invention relates to poultry processing equipment that removes viscera from turkeys.

BACKGROUND OF THE INVENTION

For many years, poultry has been processed on assembly lines in a mass-production style. Defeathered poultry carcasses are suspended in shackles attached to a continuous overhead conveyor. The carcasses are moved by the conveyor through work stations to process the carcass and to prepare it for packaging and shipping to consumers. The work stations perform a different operation on the carcass. These operations include removing the vent of the carcass, opening the abdomen, and pulling the viscera from the carcass.

For many years, these operations were performed manually. However, apparatus have been developed to mechanize many of the operations for processing poultry carcasses. In the early 1970's, an eviscerator was developed in Europe for removing viscera from chickens. Other apparatus for eviscerating chickens have since been developed.

The various known eviscerators for chickens are substantially similar in their operation. The eviscerator typically is pear-shaped, and is positioned upright. A plurality of holders are spaced around the perimeter of the eviscerator for holding a carcass for evisceration. A motor rotates the eviscerator. The continuous overhead conveyor carrying the carcasses routes around the top of the eviscerator by means of guides and idler wheels. The carcasses suspended from shackles are thereby carried past the eviscerator in alignment with one of the holders. The holders each entrap one of the carcasses on the conveyor to position the carcass for removal of the viscera. A plunger, commonly referred to in the industry as a spoon, enters the cavity of the carcass vertically from above. As the eviscerator rotates, a cam guides the travel of the spoons. One of the spoons enters the cavity, engages the viscera, and withdraws. The spoon pulls the viscera from the cavity.

The evisceration process is performed continuously as the conveyor carries the carcasses past the eviscerator. Typically the eviscerators have a diameter of five or six feet. Some large, high capacity eviscerators can eviscerate up to 100 carcasses per minute.

While these evisceration apparatus are satisfactory for processing chickens, the mechanized eviscerator has not successfully been used for turkeys in the United States. The anatomy of the chicken and the turkey differs. Chickens normally weigh between three and five pounds, whereas, the turkey carcass weighs from 12 to 25 pounds. Chickens are carried on the shackle of the conveyor on a two-point suspension. The birds are hung by the hocks. The chicken accordingly hangs vertically for eviscerating. The turkeys, however, are typically placed on three-point suspension so that the turkey carcass hangs substantially horizontally. The three-point suspension supports the turkey carcass by the hocks and the head. The larger turkey carcass does not hang properly on a two-point suspension for eviscerating and for other operations to be performed. Because of the three-point suspension requirement for turkey carcass, more of the processing operations for turkey carcasses must be performed manually. In particular, evisceration is a manual process whereby a worker manually inserts a spoon into the carcass, engages the viscera, and retracts the spoon pulling the viscera from the carcass.

Accordingly, there is a need in the art for an improved method and apparatus of eviscerating turkey carcasses.

SUMMARY OF THE INVENTION

The present invention provides an improved method and apparatus for eviscerating turkey carcass. More particularly described, the present invention provides for removal of viscera from a turkey carcass carried substantially horizontally on a three-point suspension from a first conveyor moving in a direction of conveyance. A spoon pivotally connects to a plate that moves simultaneously in the direction of conveyance and transverse thereto. The transverse movement of the plate inserts the spoon in the carcass and withdraws the spoon to remove viscera. The plate moves in response to a cam wheel that travels in a cam track from a first position to a second position. A cam follower engages a stepped portion of the guide to pivot the spoon downwardly to engage the viscera. The spoon then retracts as the cam wheel moves in the cam track from the second position to the first position.

More particularly described, the present invention provides an apparatus for removing viscera from a turkey carcass carried substantially horizontally on three-point suspension attached to a first conveyor moving in a direction of conveyance. A frame for the apparatus supports a pair of continuous second conveyors that attach to sprockets in spaced-apart relation, with means for driving the second conveyors in synchronization with the travel of the first conveyor. A plurality of spoon modules attach in spaced-apart relation to the pair of second conveyors. Each spoon module comprises a pair of blocks that attach the spoon module to the second conveyors. The pair of blocks are transversely aligned on the second conveyors. A pair of spaced-apart rods connect between the blocks. The pair of rods slidably receive a plate for transverse travel between the pair of conveyors. The frame also supports a cam track that defines a general V-shape path. A cam wheel attached to the plate travels in the cam track. A spoon having a cam follower pivotally connects to the plate. A poultry carcass is carried by the first conveyor into alignment with one of the spoon modules. The spoon moves the carcass in response to the cam wheel travelling in the cam track from a first position to a second position. The cam follower engages the stepped portion to pivot the spoon downwardly to engage the viscera. The spoon retracts from the carcass in response to the cam follower travelling in the cam track from the second position to the first position. Retraction of the engaged spoon pulls the viscera from the turkey carcass.

The present invention further provides a tool which removes viscera from a cavity of a poultry carcass while preventing the tool from piercing a distal end of the carcass. Generally described, the tool is a spoon that attaches to a telescoping coupler. The coupler retracts from a first position to a second position in response to the spoon contacting the distal end of the turkey carcass.

More particularly described, the tool includes a cylinder having a bearing that slidably mounts for travel between a shoulder of a shaft and a stop at one end of the shaft. The cylinder receives a spring that bears against the stop to bias the cylinder from the shaft. The cylinder press-fit connects to the bearing. A spoon attaches at a first end to the cylinder and has at least one tooth attached at an angle to the second end. The tool is operatively attached to a driver means for moving the tool between a first position and a second position with respect to the poultry carcass. The spoon enters a cavity of the poultry carcass in response to movement of the driver means. In response to the spoon contacting a distal end of the poultry carcass, the cylinder bears against the spring and moves retractingly on the shaft. This prevents the spoon from pushing through a distal end of the poultry carcass.

The present invention further provides a method of removing viscera from a poultry carcass. Generally described, the method comprises inserting a spoon into the carcass held substantially horizontally on a three-point suspender attached to a first conveyor. A cam wheel travels in a cam track to move the spoon into and out of the turkey carcass. A cam follower contacts a stepped portion of a guide to pivot the spoon downwardly for engaging viscera in the carcass. The spoon then retracts in response to the cam wheel travelling in the cam track from the second position to the first position.

More particularly described, the method removes viscera from a poultry carcass carried substantially horizontally on three-point suspension attached to a first conveyor moving in a direction of conveyance. The method comprises aligning the poultry carcass with a spoon module attached to a pair of continuous second conveyors driven by sprockets in synchronization with the travel of the first conveyor. A spoon module pivotally connects to a plate that slidably attaches to a pair of spaced-apart rods connected between the second conveyors. The spoon inserts into the poultry carcass in response to moving the plate transversely between the second conveyors on the pair of rods from a first position to a second position. A cam wheel travelling in a cam track guides the movement of the plate. A cam follower attached to the spoon contacts a cam which pivots the spoon downwardly to engage the viscera. The spoon then retracts from the second position to the first position in response to the cam wheel travelling in the cam track and thereby pulls the viscera from the poultry carcass.

Accordingly, it is an object of the present invention to improve the apparatus used for processing poultry.

It is another object of the present invention to reduce the manual labor required to process poultry.

It is another object of the present invention to improve the methods of processing poultry.

It is another object of the present invention to decrease damage to processed poultry by restricting the spoon from punching through a distal end of a poultry carcass.

These and other objects, advantages and features of the present invention will become apparent from a reading of the following detailed description of the invention and claims in view of the appended drawings.

DETAILED DESCRIPTION OF THE PREFERRED EMBODIMENTS

Figure 1:
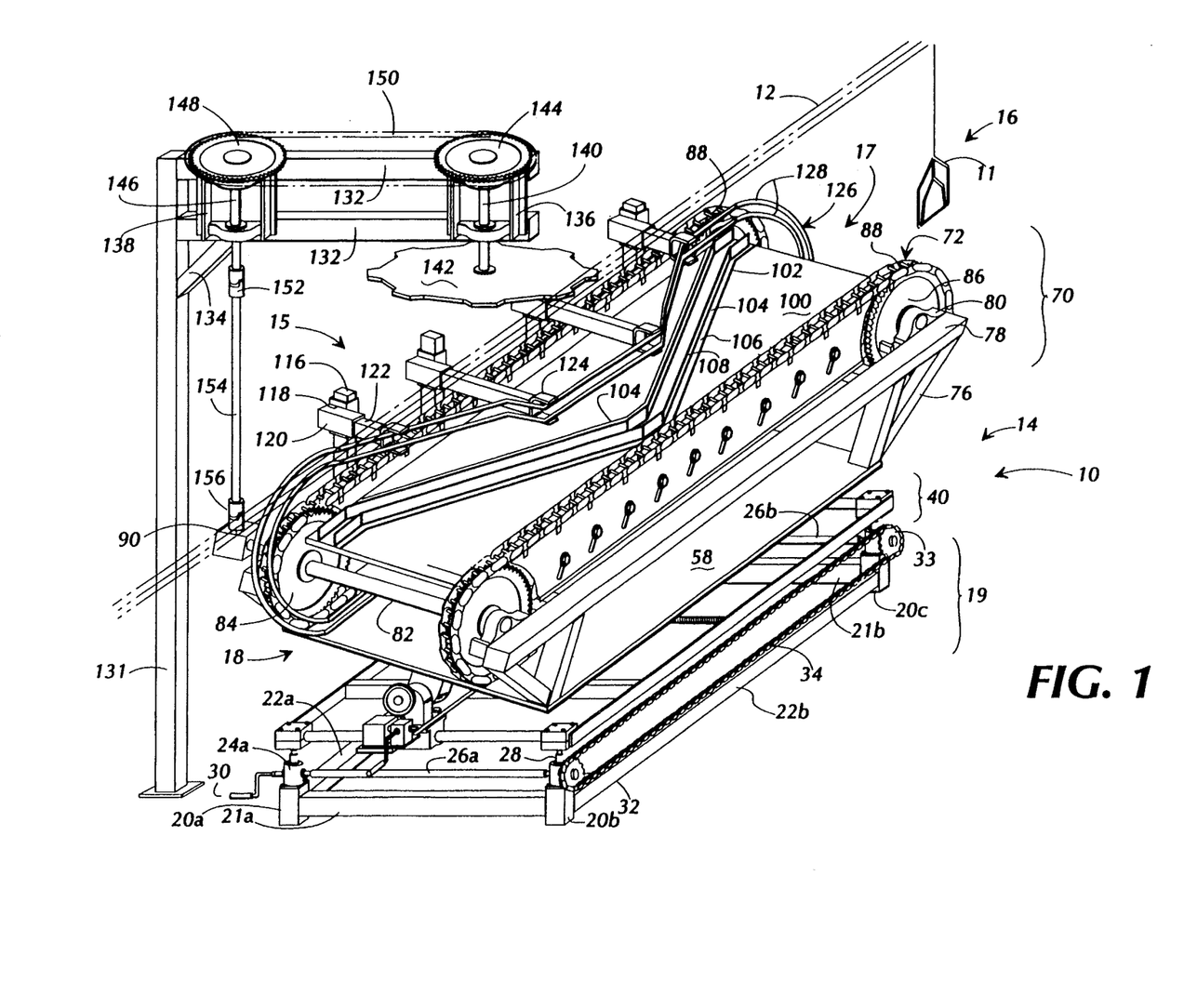
FIG. 1 is a perspective view of an apparatus for eviscerating poultry.
Figure 2:
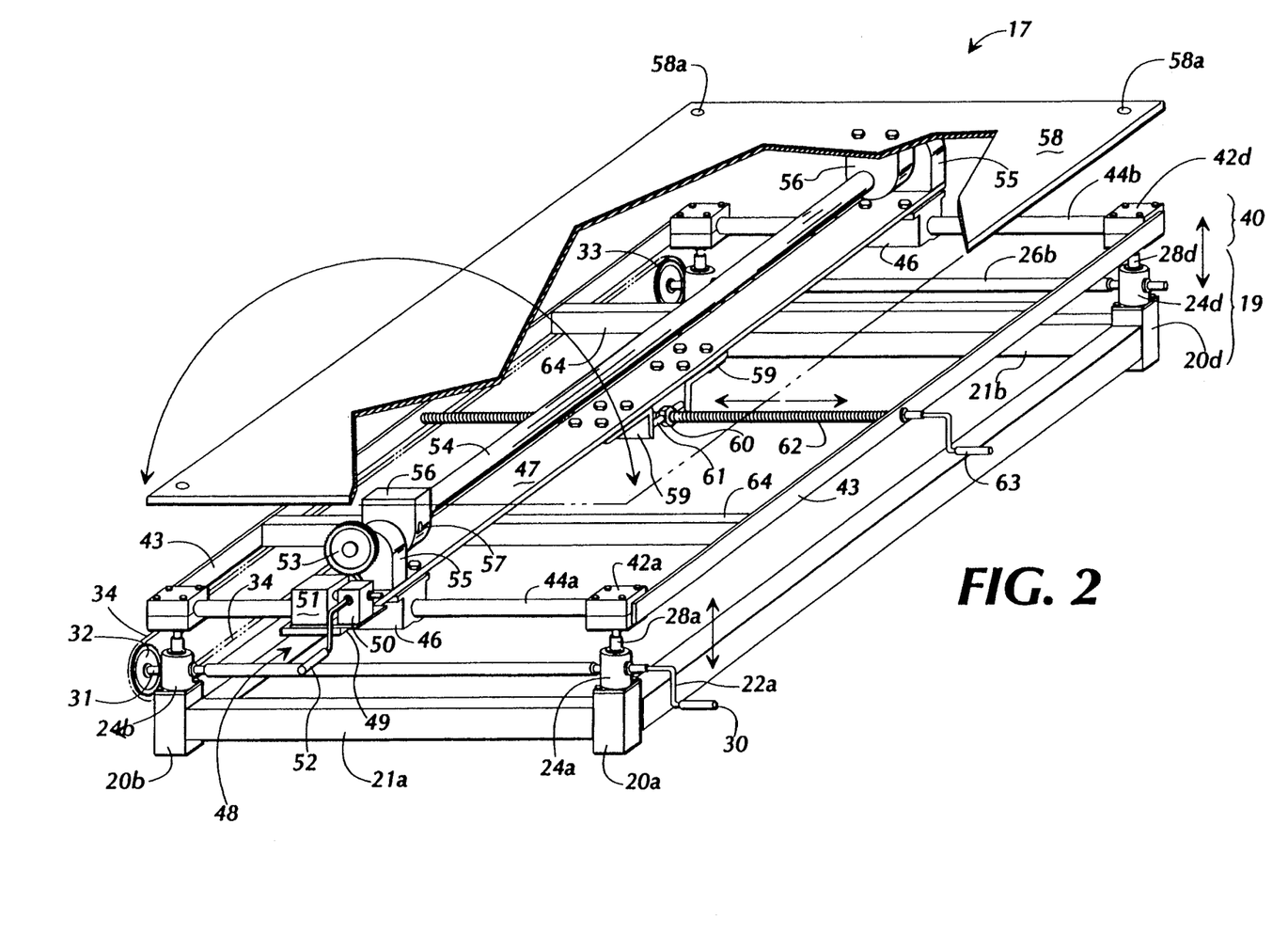
FIG. 2 is a perspective view of the vertical, horizontal, and tilt adjustment mechanisms of the apparatus illustrated in FIG. 1.

Referring now in more detail to the drawings, in which like numerals indicate like parts throughout the several views, FIG. 1 illustrates a perspective view of a preferred embodiment of an apparatus 10 referred to herein as an eviscerator, for removing viscera from turkey carcass carried on one of a plurality of suspenders 11 attached to a continuous conveyor 12. The eviscerator 10 has a processing side 14 and an adjustment side 15. The processing side 14 of the eviscerator 10 engages the turkey carcasses carried on the conveyor 12. The adjustment side 15 includes mechanisms for adjusting the vertical, horizontal, and angle of tilt positions of the eviscerator 10, as discussed below. An arrow designated 16 shows the direction of conveyance of the conveyor 12 for carrying turkey carcasses past the eviscerator 10 which has a first end 17 and a second end 18. FIG. 2 provides a detailed view from the adjustment side 15 of the vertical, horizontal, and tilt mechanisms of the eviscerator 10, as discussed below.

With reference to FIGS. 1 and 2, the eviscerator 10 stands on a lower frame generally designated 19. As discussed below, the lower frame 19 includes a mechanism for vertical positioning of the eviscerator 10. The lower frame has four jack bases 20a, 20b, 20c, and 20d. An end member 21a connects between the jack bases 20a and 20b. Another end member 21b connects between the jack bases 20c and 20d. A side member 22a connects between the jack bases 20a and 20d on the adjustment side 15. Another side member 22b connects between the jack bases 20b and 20c on the processing side 14. The longitudinal ends of the end members 21 and the side members 22 rigidly join to the jack bases 20, such as by welding.

A vertical adjustment jack 24 rigidly connects at an upper end of each jack base 20. Each jack 24 includes a vertically displaceable piston 28. The jack 24a includes a handle 30 extending outwardly from the jack on the adjustment side 15. The handle 30 operatively engages the piston 28 to move the piston between a first lowered position and a second fully extended position. The piston 28 may be moved to an intermediate position between the first and second positions. A jack activating rod 26a connects the jack 24a to the jack 24b. One longitudinal end of the activating rod 26a operatively engages the handle 30, so as to rotate the activating rod axially as the handle turns.

A shaft 31 extends outwardly from the jack 24b. The shaft 31 communicates with the rod 26a. A drive gear 32 connects to the shaft 31. Similarly, the jack 24c includes a shaft 31 with an idler gear 33. A chain 34 extends between and wraps around the gears 32 and 33. A jack activating rod 26b connects the jack 24c to the jack 24d.

The lower frame 19 supports a middle frame generally designated 40. The middle frame 40 includes a mechanism that enables the eviscerator 10 to move laterally and a mechanism to tilt the eviscerator 10 at an angle, as discussed below. The middle frame includes four jack blocks 42. One of the jack blocks 42 rigidly connects to the upper end of the piston 28 of each jack 24. A side rail 43 connects between the jack blocks 42 on each of the adjustment side 15 and the processing side 14. A horizontal adjustment bar 44a rigidly connects between the jack block 42a and the jack block 42b. A second horizontal adjustment bar 44b extends between the jack block 42c and 42d. The adjustment bars 44 are preferably elongate round tubes. Each adjustment bar 44 receives a sliding block 46 that includes a bore through which the adjustment bar extends. The sliding block 46 moves longitudinally along the adjustment bar 44 as discussed below. An elongate guide plate 47 extends between the two sliding blocks 46. The guide plate 47 connects to an upper surface of the sliding blocks 46. A manual power drive 48 mounts to an end 49 of the guide plate 47. The power drive 48 includes a first gear box 50 and a second gear box 51. A handle 52 connects to the first gear box 50 to rotate the gears manually, as discussed below. The second gear box engages a gear 53 that connects to an elongate shaft 54.

Two pairs of blocks support the shaft 54 which extends parallel to the guide plate 47. First, a pair of outside blocks 55 connect to the guide plate 47. The shaft 54 extends through a bore in the outside blocks 55 and freely rotates with respect to the outside blocks. Second, a pair of inside blocks 56 include a bore for receiving the shaft 54. One of the inside blocks 56 is disposed inwardly of each outside block 55. The shaft 54 passes through the blocks 56. A set screw 57 threadingly engages a bore in the blocks 56 and contacts the shaft 54. The set screw 57 rigidly fixes the block 56 to the shaft 53. Rotating the shaft 54 causes the blocks 56 to rotate and define an arcuate path around the axis of the shaft. A base plate 58 connects to the blocks 55. As discussed below, an upper frame connects with bolts through a plurality of bores 58a to the base plate 58. The upper frame supports the tools and guide cams for processing the turkey carcass, as discussed below.

A pair of spaced-apart brackets 59 connect to the guide plate 47 on a bottom surface medial the ends. The brackets 59 support a nut 60 which has a pair of support pins 61 extending outwardly on two sides. The pins 61 engage bores in the brackets 59. A horizontal screw 62 extends between the side rails 43. The longitudinal ends of the screw 62 insert into bores in the side rails 43 for support. The screw passes through the nut 60. A handle 63 engages the screw 62 on the adjustment side 15. The screw 62 is thereby axially rotatable, as discussed below. A pair of connectors 64 extend between the side rails 43 for rigidity.

An upper frame generally designated 70 connects to the base plate 58. The upper frame 70 supports a pair of parallel conveyors 72 which carry a plurality of spaced-apart spoon modules 74 (best illustrated in FIGS. 3 and 4) for eviscerating poultry. The upper frame 70 includes a pair of end support members 76 and an elongate side member 78 on each side 14 and 15 of the eviscerator 10. The side members 78 rigidly connect to the end supports 76.

The upper frame 70 supports the pair of parallel, spaced apart conveyors 72. A pillow block bearing 80 attaches to an inside surface of each side member 78 at its longitudinal ends. The pillow block bearings 80 at the second end 18 of the eviscerator 10 support a drive shaft 82. The drive shaft 82 extends transverse between the sides 14 and 15. A drive sprocket 84 connects to the drive shaft 82 near each longitudinal end adjacent the respective pillow bearing 80. The drive shaft 82 connects to a drive gear box 90 which operatively connects to the conveyor 12 carrying the poultry for evisceration, as discussed below. At the second end 17 of the eviscerator 10, an idler shaft (not illustrated) extends between the pillow bearings 80. A pair of idler sprockets 86 connect to the idler shaft which freely turns in the pillow bearings 80. A continuous drive chain 88 engages the respective drive sprocket 84 and 86 on each side 14 and 15.

Figure 4:
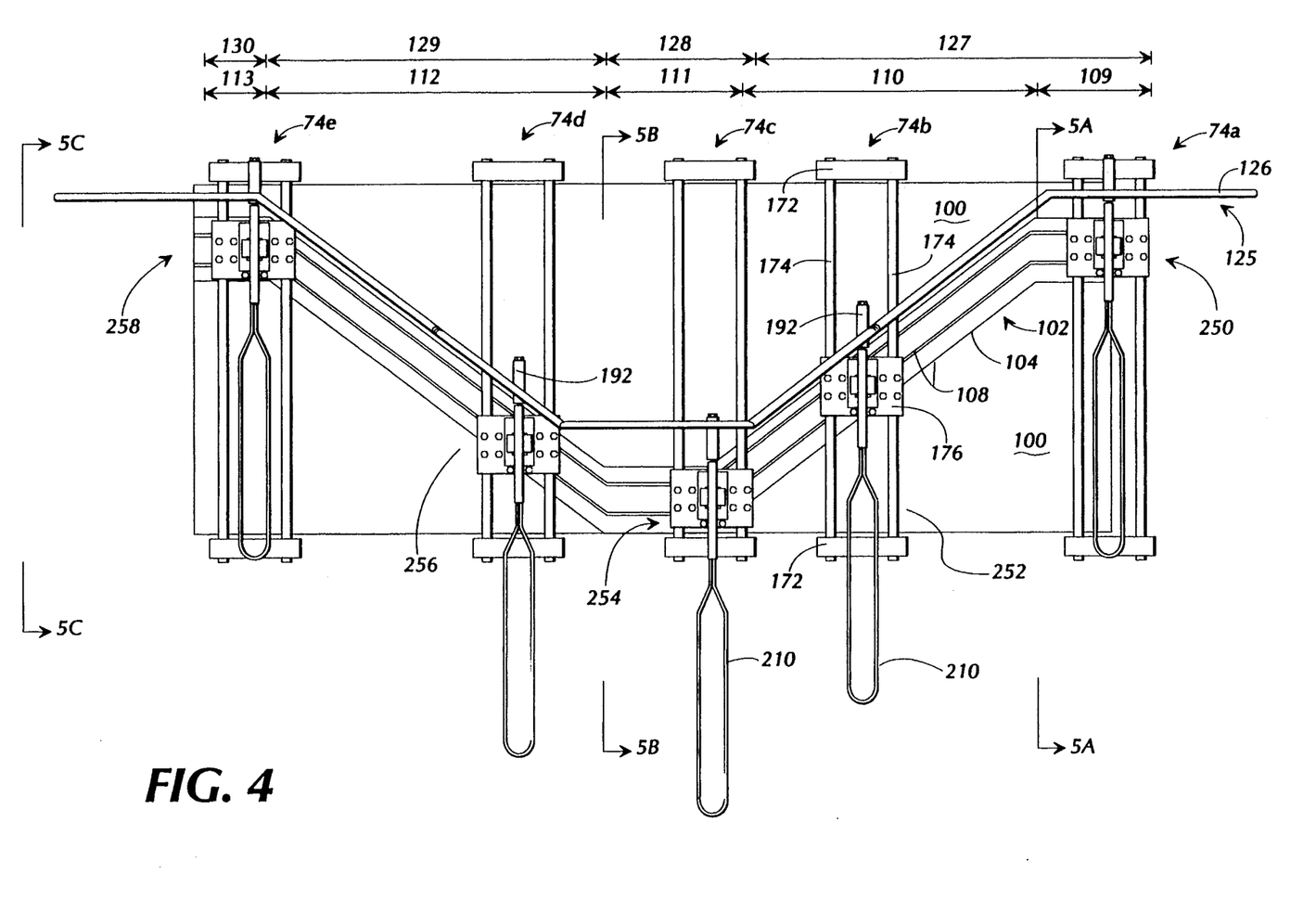
FIG. 4 is a top plan view of the eviscerator of FIG. 1, illustrating the positions of the spoon module during the process of eviscerating poultry.

The upper frame 70 supports abase plate 100 to which a cam track 102 is secured. The cam track 102 guides the travel of the spoon modules 74 for eviscerating the turkey carcasses carried on the conveyor 12, as discussed below. The cam track 102 is defined by two parallel angle members 104. Each angle member has a footing 106 and an upstanding wall 108. A plurality of bolts extend through bores in the footing 106 to connect the angle member 104 to the base plate 100. The cam track 102 extends from the first end 17 of the eviscerator 10 to the second end 18. In plan view, the cam track 102 defines a general V-shape on the base plate 100, for a purpose discussed below. As best shown in FIG. 4, the cam track 102 defines a plurality of sections, including a lead-in section 109, an insert section 110, an engage section 111, a withdrawal section 112, and a lead-out section 113. The sections guide the travel of the spoon modules 74 during evisceration, as discussed below.

The adjustment side 15 of the apparatus 10 includes a plurality of vertically disposed support tubes 116. Each of the support tubes 116 connects to a horizontally disposed support tube (not illustrated) that extend transversely between the side supports 78. The base plate 100 sits on and connects to the horizontal support tubes.

In the illustrated embodiment, there are four vertical supports 116. Each vertical support 116 includes a vertical adjustment sleeve 118. A plurality of bolts (not illustrated) pass through the vertical adjustment sleeve 118 into the support 116 to selectively position the sleeve on the support. A horizontal adjustment sleeve 120 rigidly attaches on aside of each vertical adjustment sleeve 118. The horizontal adjustment sleeve 120 receives a horizontally disposed support tube 122. A plurality of bolts (not illustrate)thread through bores in the sleeve 120 to secure the tube 122 in position. A bracket 124 attaches to a distal end of each support 122. The bracket 124 in the illustrated embodiment is C-shaped in end view. The brackets 124 support a spoon roller guide 125 defined by a pair of spaced apart rails 126 which guide the angular positioning of the spoon modules on the eviscerator 10 during evisceration, as discussed below. One rail 126 attaches to an upper arm of the support 124. The second rail 126 attaches to the lower arm of the support 124. The guide 125 is formed with a plurality of sections that correspond to the sections in the cam track 102. As best shown in FIG. 4, the guide 125 includes an angle-up section 127, an angle-down section 128, a rising section 129, and a release section 130.

The apparatus 10 operates in synchronization with the conveyor 12 carrying the poultry carcasses for processing, as discussed below. A drive chain couples the conveyor 14 with the conveyors 72 of the eviscerator 10. An elongate member 131 stands adjacent the apparatus 10. A pair of arms 132 extend outwardly from an upper end of the member 131. A brace 134 supports the lower of the two arms 132. A pair of pillow block bearings 136 and 138 attach to the pair of arms 132. The pillow block bearing 136 includes a shaft 140 which couples at a first lower end to a drive sprocket 142 and at a second upper end to a chain sprocket 144. The pillow block 138 connects to the arms 132 near the frame 131 and supports a shaft 146. A chain sprocket 148 connects to the shaft 146 at a first upper end. A continuous chain 150 extends between the chain sprockets 148 and 144, for a purpose discussed below. A lower end of the shaft 146 couples through a lovejoy 152 to a drive shaft 154. A second lovejoy 156 at a lower end of the drive shaft 154 connects to the drive gear box 90 which, as discussed above, operatively connects to the drive shaft 82 of the eviscerator 10.

Figure 3:
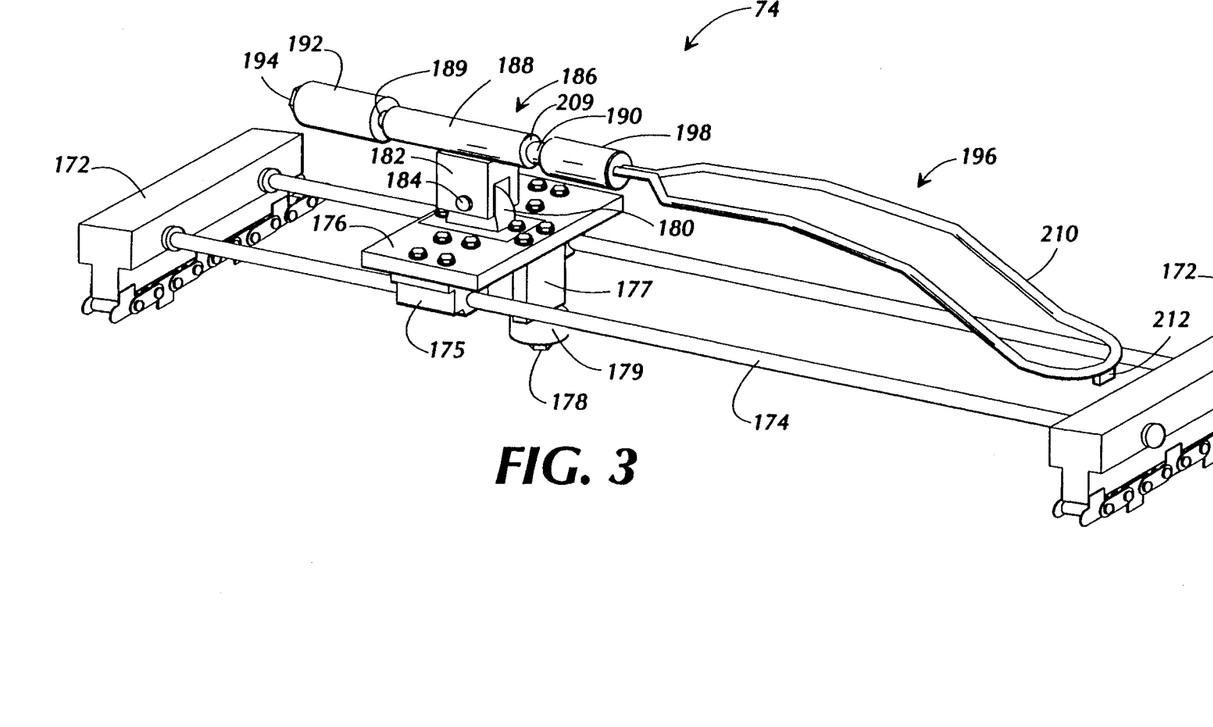
FIG. 3 is a perspective partially cut-away view of a spoon module that operatively engages the processing apparatus illustrated in FIG. 1.

FIG. 3 illustrates a spoon module 74 used with the apparatus 10 for eviscerating poultry. The apparatus 10 includes a plurality of spoon modules 74 which are spaced-apart and attached to the conveyors 72 for conveyance in synchronization with the conveyor 14. Each spoon module 74 includes a pair of module end blocks 172 which are rigidly secured to one of the respective conveyors 72. A pair of parallel rods 174 extend between the module end blocks 172. The longitudinal ends of the rods 174 connect to the end blocks 172. Each rod 174 receives a sliding block 175 which is capable of longitudinal travel on the rod. A module plate 176 connects to an upper surface of the blocks 175. The sliding blocks 175 hold the module plate 176 spaced-apart from the rods 174. A cam wheel block 177 extends downwardly from a lower surface of the module plate 176. A bolt 178 threadingly engages a bore in a bottom face of the cam wheel block 177. The bolt 178 defines an axle for a cam wheel 179 which travels in the cam track 102. A spoon holder 180 connects to the module plate 176. A pivot block 182 pivotally connects by a pin 184 to the holder 180. A spoon shaft 186 rigidly connects to an upper surface of the pivot block 182.

Figure 3A:
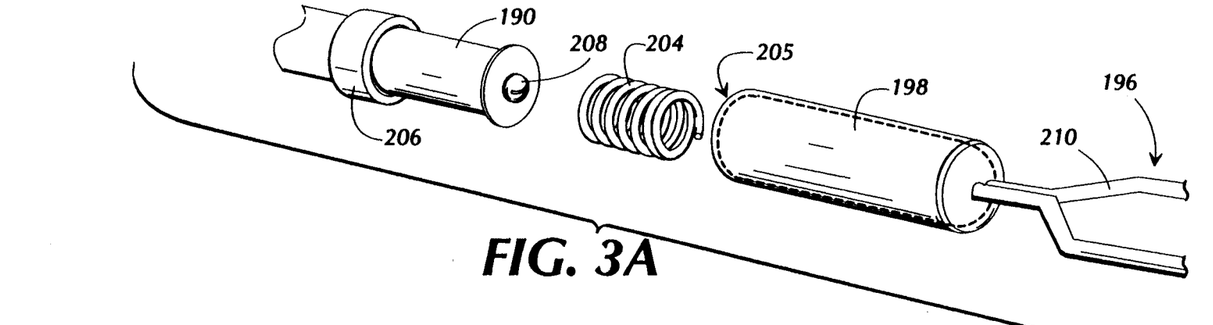
FIG. 3A is a detailed exploded view of the spoon module illustrated in FIG. 3.

The spoon shaft 186 connected to the pivot block 182 thereby pivotably mounts to the module plate 176. The spoon shaft 186 is an elongate cylinder having a central portion 188 of a first diameter and a pair of end portions 189 and 190 each of a second smaller diameter. The central portion 188 attaches to the pivot block 182. The end portion 189 defines an axle that receives a roller 192. A bolt 194 threadedly engages a bore in distal end of the end portion 189 to secure the roller 192 to the spoon shaft 186. The roller 192 travels between the rails 126 of the roller guide 125, for a purpose discussed below. A spoon generally designated 196 attaches to the end portion 190. With reference to FIG. 3A, the spoon 196 includes a coupler 198 which is an open-ended cylinder. The coupler 198 receives a spring 204 through an open end 205. A bearing 206 inserts onto the end portion 190 for being received into the open end of the coupler 198. A washer 207 attaches with a bolt 208 to a longitudinal face of the end portion 190. The coupler 198 slidingly inserts over the washer 207 and matingly engages the bearing 206. The coupler 198 press-fits on to the bearing 206. This connects the spoon 196 to the spoon shaft 186. The spring 204 pushes against the washer 207 to bias the spoon 196 from a shoulder 209 between the end portion 190 and the central portion 188 of the spoon shaft 186. The spoon 196 comprises an arm 210 that attaches to the coupler 198. A distal end of the arm 210 includes a tooth 212 for engaging and removing viscera from poultry.

FIG. 4 is a detailed top plan view of the eviscerator 10 illustrated in FIG. 1. A plurality of spoon modules 74a–e are shown at different positions to illustrate stages of the method of eviscerating poultry with the apparatus of the present invention. In practice of the invention, the spoon modules 74 are uniformly spaced-apart on the conveyor 72. The module end blocks 172 connect the spoon modules 74 to the conveyors 72. The cam wheels 179 (not illustrated in FIG. 4) travel in the cam track 102. The cam track 102 defines a V-shaped path on the base plate 100 for guiding the travel of the spoon modules 74. The cam wheel 179 bears against the vertical walls 108 of the angle members 104. FIG. 4 further illustrates the plurality of sections of the cam track 102, including the lead-in section 109, the insert section 110, the engage section 111, the withdrawal section 112, and the lead-out section 113. The cam wheel 179 travels in these sections of the cam track 102 to guide the lateral travel of the spoon 170 during evisceration, as discussed below.

The roller 192 of the spoon module 74 inserts in the gap between the rails 126 of the spoon roller guide 125 to guide the pivoting of the spoon module 74. The pair of rails 126 of the spoon roller guide 125 similarly include the plurality of sections for controlling the pivoting of the spoon modules 74 during evisceration. These sections are the angle-up section 127, the angle-down section 128, the rising section 129, and the release section 130, as discussed below.

Figure 5A:
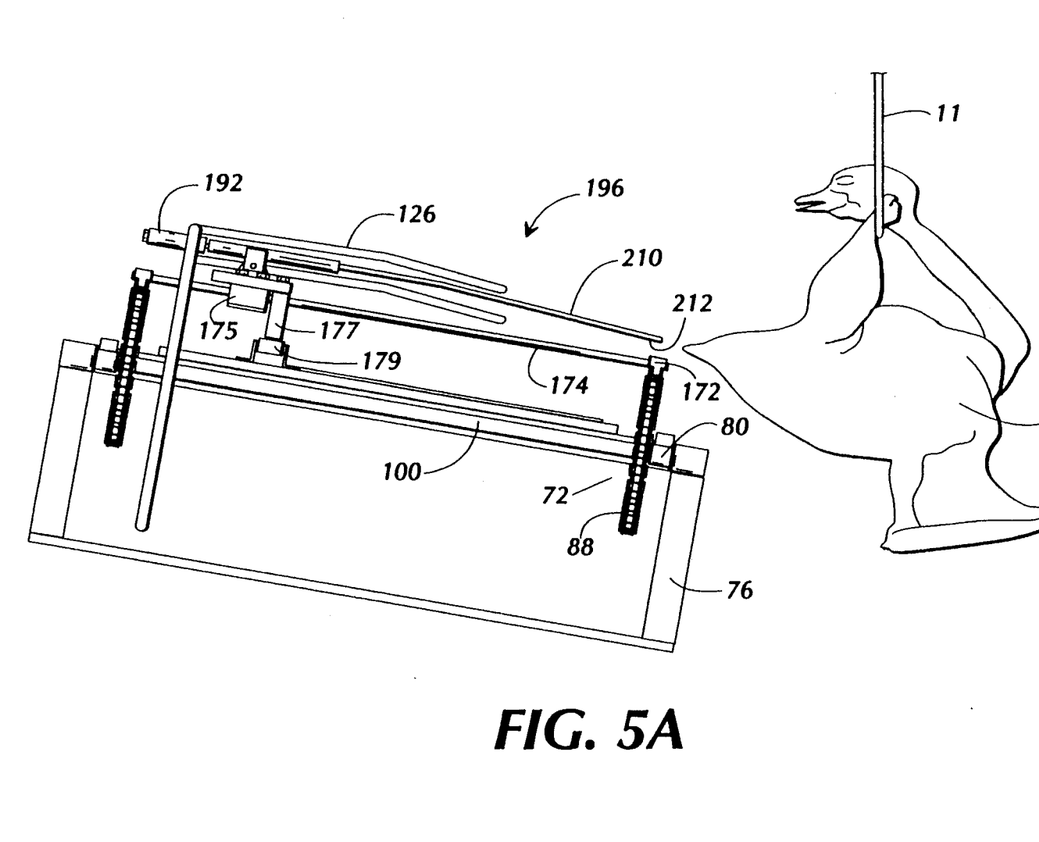
FIGS. 5A, 5B and 5C are partial side views illustrating the spoon entering and exiting the cavity of a poultry carcass, taken along lines 5A—5A, 5B—5B, and 5C—5C, respectively, of FIG. 4.
Figure 5B:
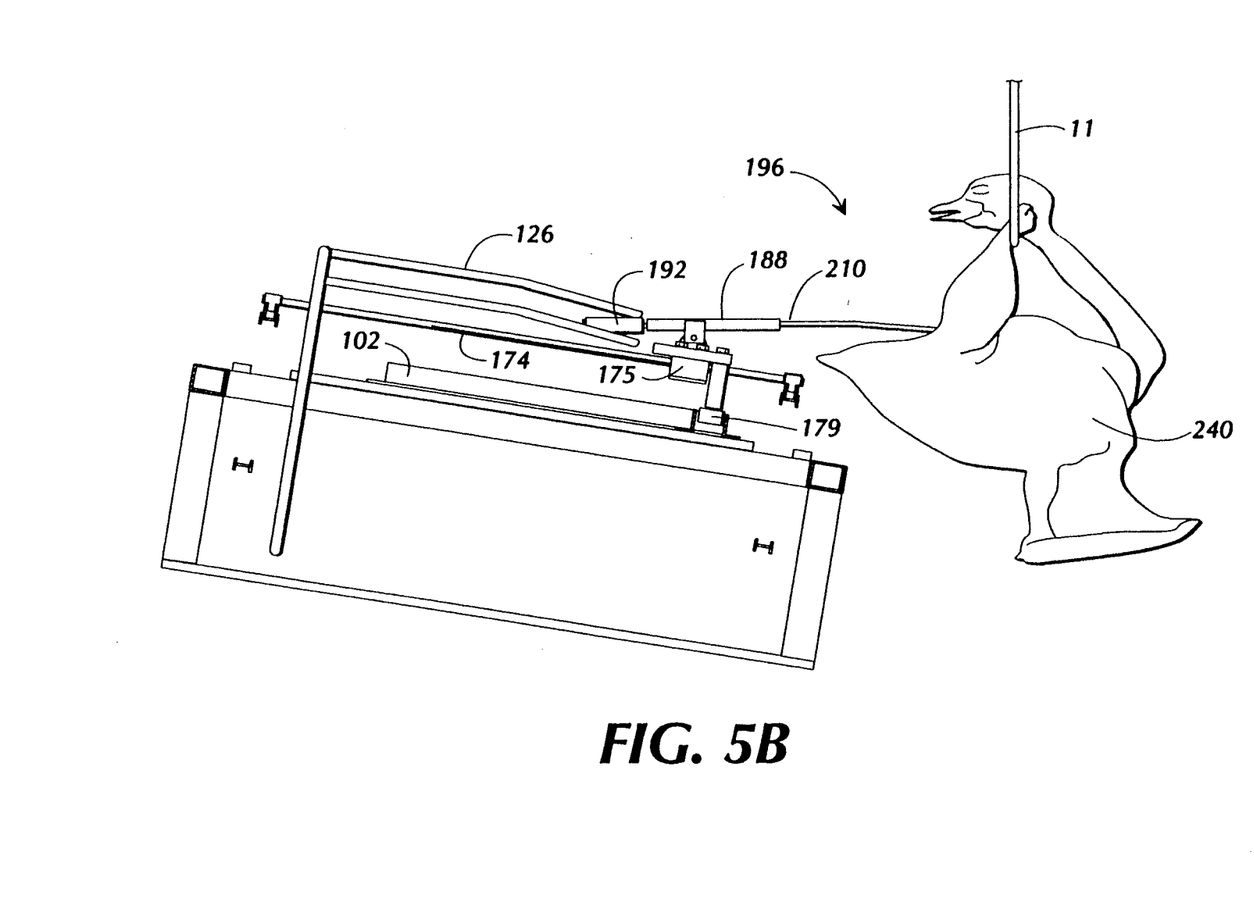
Figure 5C:
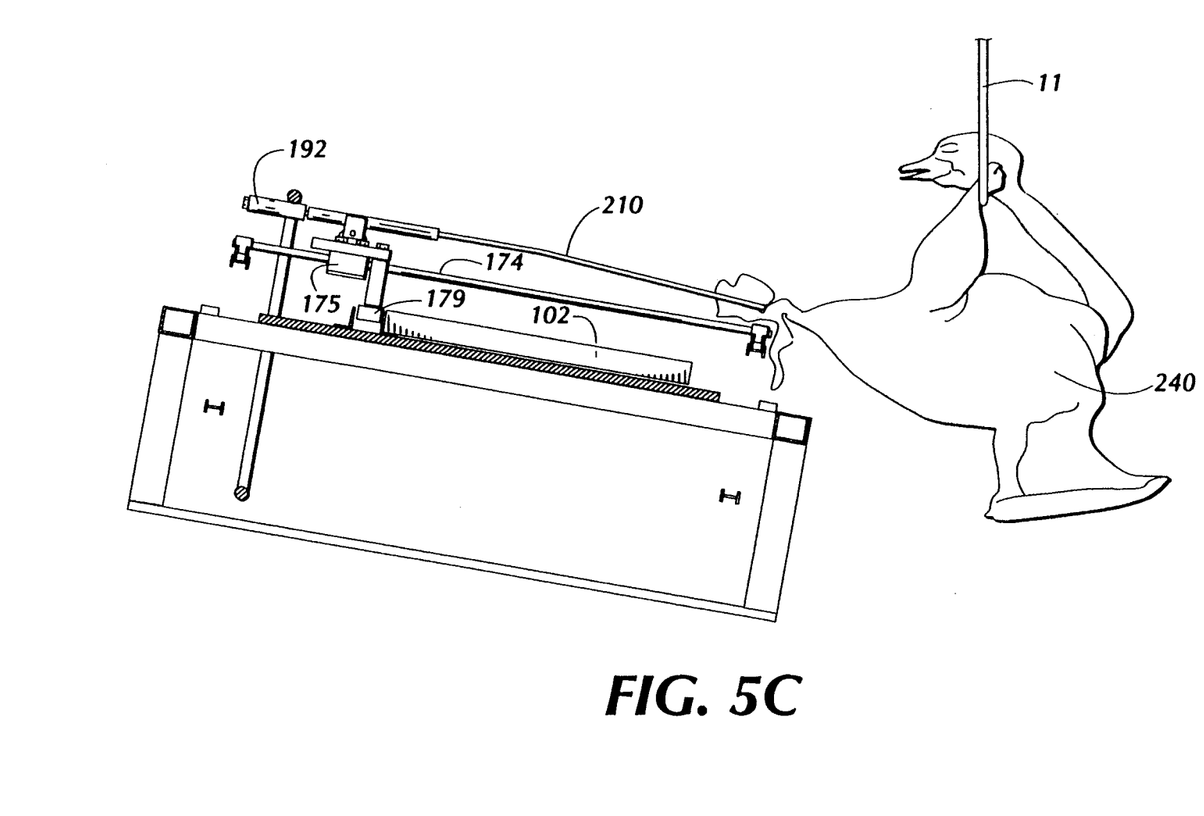

With reference to the drawings, the eviscerator 10 operates in synchronization with the conveyor 12. The conveyor 12 engages the drive sprocket 142 to turn the shaft 140. This rotates the chain sprocket 144 and drives the chain 150. The idler chain sprocket 148 thereby rotates which turns the shaft 146. The lovejoy 152 communicates the rotation to the drive shaft 154 which couples to the drive gear box 90 for the drive shaft 82. The eviscerator 10 thereby operates in synchronization with the speed of the conveyor 12. One of the plurality of spoons 196 aligns in sequence with one of the plurality of suspenders 11 that carries the turkey carcasses on the conveyor 12 (not illustrated in FIG. 4). As the conveyor 12 carries the suspenders 11 in the direction of conveyance 16 past the eviscerator 10, each spoon module moves both in the direction of conveyance and laterally to insert the spoon 196 into the turkey carcass and to retract the spoon. The spoon 196 engages and extracts viscera in the carcass. FIGS. 4 and 5 illustrate this process. FIGS. 5A, 5B, and 5C are cross-sectional views of the eviscerator 10 as illustrated in FIG. 4 showing stages in the evisceration process.

The suspender 11 holds the turkey carcass 240 in a three-point suspension by the hocks and the head. This disposes the turkey carcass in a substantially horizontal position with the vent facing the processing side 14 of the eviscerator 10. The turkey carcass 240 is carried on the suspender 11 as illustrated in FIG. 5a to the first end 17 of the eviscerator 10. The spoon 196 is in its first retracted position generally designated 250 as the cam wheel 178 travels in the cam track 102. The conveyors 72 move the spoon modules 72 through the lead-in section 109 and into the insert section 110 generally designated 252. The cam track 102 then angles towards the processing side 14 of the eviscerator 10. The cam wheel 178 follows the cam track 102 that extends at an angle and transverse between the sides 14 and 15. The sliding blocks 175 move on the rods 174 longitudinally. The spoon 196 thereby moves past the edge of the eviscerator 10 and into the turkey carcass. The cam roller 192 simultaneously travels in the angle-up section 127 of the roller guide 125. During this portion of travel, the spoon 196 is in an upward-angled position, as best illustrated in FIG. 5B.

The spoon 196 moves laterally from the eviscerator 10 into the cavity of the turkey carcass until the insert section 100 ends at 254. The distal end of the spoon 196 with the tooth is positioned deep within the cavity. Depending on the size of the turkey and the lateral displacement of the eviscerator 10, the distal end may contact the cavity wall.

With reference to FIG. 3A, the spoon module 74 accommodates the distal end of the spoon 196 contacting the cavity wall of the turkey carcass. The force of the spoon 196 then pushes against the spring 204 and the coupler 198 moves laterally towards the shoulder 209 of the spoon shaft 186. Moving the coupler 198 from its first outward biased position to a second inward position closer to the shoulder 209 prevents the spoon 196 from punching through the cavity wall of the turkey carcass.

After the cam wheel 178 reaches the end of the insert section 110 (see 254) it moves into the engage section 111. The spoon 196 has been inserted to its full extent into the turkey carcass. The roller guide 125 travels in the angle down section 129. The rails 126 angle upwardly to pivot the spoon 196 downwardly. The tooth 212 engages the viscera in the interior cavity of the turkey carcass. The spoon module 74 is then in its second extended position.

The cam wheel 178 continues to move and then enters the withdrawal section 112 of the cam track 102 generally designated 256. The cam wheel 178 moves from the second extended position at 254 to a third retracted position 256. The sliding blocks 175 move on the rods 174 longitudinally. The spoon 196 is thereby retracted. As discussed above, the coupler 198 may be moved towards the shoulder 209 to prevent the spoon 196 from breaking through the cavity wall. As the spoon module 74 retracts, the spring 204 returns the coupler 198 to its first outward biased position. The washer 195 forms a stop to prevent the coupler 198 from coming off of the end portion 190 of the spoon shaft 186.

The tooth 212 pulls the engaged viscera from the turkey carcass. The cam roller 192 simultaneously travels on the rising section 129 of the guide 125. The rising section 129 has a slight angler so that the spoon 196 slowly pivots upward as the spoon module 74 retracts. When the spoon 196 is fully retracted, generally designated 258, the viscera is pulled outwardly of the turkey carcass, as illustrated in FIG. 5C. In an alternate embodiment (not illustrated) the distal end of the rising section 129 includes a sharp downward angle for a short portion of the rails 126. This defines a bump which causes the spoon 196 to rise quickly. The bump facilitates release of the viscera from the tooth 212.

The spoon module 74, carried by the conveyor 172, moves downwardly at the end 18 of the eviscerator 10, and returns to the first end 17 by travelling in the area below the base plate 100, as best seen in FIG. 1. The process described above repeats in sequence by each of the spoon modules 74 that are mounted on the conveyors 72. Although not illustrated, the guide 125 and the cam track 104 are continuous and extend longitudinally on a lower side of the base plate 100 from the second end 18 to the first end 17. During the return travel, the spoon modules 74 are continuously washed by conventional spray-wash nozzles (not illustrated) to wash debris and materials off of the spoon 196. The components of the eviscerator 10 preferably are made of food-grade materials such as 300-grade or higher stainless steel.

As discussed above with respect to FIGS. 1 and 2, the eviscerator 10 includes mechanisms that enable the eviscerator to move vertically, to move laterally, and to tilt at an angle. The vertical adjustment is made by rotating the handle 30 that connects to the jack 24a. In response, the piston 28a moves vertically. The jack activating rod 26a also rotates to drive the jack 24b vertically. The drive gear 32 rotates in response to rotation of the jack activating rod 26. As the drive gear 32 rotates, the chain 34 communicates with the idler gear 33. Rotation of the idler gear 33 causes the jack 24c to operate. The jack activating rod 26b rotates to operate the jack 24d. The jacks 24 thereby operate simultaneously to raise or lower the eviscerator 10 in response to rotation of the handle 30.

The eviscerator 10 also includes a mechanism to move the eviscerator laterally with respect to the conveyor 12. The handle 63 rotates to turn the screw 62 through the nut 60 fixedly held by the guide plate 47. The sliding blocks 46 of the middle frame 40 move longitudinally on the adjustment bar 44 in response to rotation of the screw 62. This moves the base plate 58 laterally.

The eviscerator 10 also includes mechanisms to tilt the eviscerator at an angle, as illustrated in FIG. 2. The handle 49 drives the first gear box 50 and the second gear box 51. In a preferred embodiment, the first gear box 50 has a 15 to 1 ratio and the second gear box 51 has a 48 to 1 ratio. This provides a 720 to 1 turning ratio for the gear drive on the tilting mechanism. As the handle 49 rotates, the gear 53 is rotated. This causes the shaft 54 to rotate through the outside blocks 55. The blocks 56 are fixed to the shaft 54 and to the plate 58. As the shaft 54 rotates the base plate 58 pivots. In this manner, the angle of entry of the spoons 170 into the turkey carcasses can be adjusted.

The lateral and vertical position of the spoon roller guide 125 can be adjusted. For lateral changes, the bolts (not illustrated) holding the horizontal support tube 122 in the horizontal adjustment sleeve 120 are released. The tube 122 is moved in the sleeve 120 to the changed position. The bolts are reinstalled to fix the tube 122 in the sleeve 120. The vertical position is changed by first releasing the bolts (not illustrated) that hold the vertical adjustment sleeve 118 on the support 116. After the sleeve 118 is positioned, the bolts are then tightened to fix the sleeve on the support 116.

The apparatus of the present invention accordingly improves the processing of poultry, especially turkey, by efficiently and reliably removing viscera from turkeys. The eviscerator 10 operates in synchronization with the conveyor carrying the turkey carcasses for processing. In an alternate embodiment, the spoon modules 74 are replaced with other tools for processing turkeys. For example, a cutter could mount to the block 178 for opening the vent in the turkey. Other processing tasks could also be accomplished with the apparatus disclosed in this specification.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departing from the spirit of the invention as described by the following claims.

I claim:

1. An apparatus for processing a poultry carcass carried substantially horizontally on three suspenders attached to a first conveyor, comprising:
   a frame carrying a cam track that defines a V-shape path;
   a pair of continuous second conveyors attached to sprockets in a spaced-apart relation;
   means for driving the second conveyors in synchronization with the travel of the first conveyor; and
   a plurality of tool modules attached in spaced-apart relation to the pair of second conveyors, each tool module comprising:
   a pair of blocks, one of which attaches to a separate one of the second conveyors and the pair being transversely aligned;
   a pair of spaced-apart rods connected between the blocks;
   a plate slidably received on the pair of rods for transverse travel between the pair of conveyors; and
   a tool connected to the plate with a cam wheel connected to the plate,
   whereby a poultry carcass, being carried by the first conveyor into alignment with one of the tool modules, is processed by the tool brought into contact with the poultry carcass in response to the cam wheel traveling in the cam track from a first position near one of the second conveyors to a second position near the other of the second conveyors.

2. The apparatus as recited in claim 1, wherein the tool is a spoon pivotally connected to the plate for eviscerating the poultry carcass; and
   further comprising:
   a cam follower attached to the spoon for controlling the pivoting of the spoon; and
   a cam attached to the frame for engaging by the cam follower to pivot the spoon,
   whereby the spoon, being pivoted upwardly to enter the poultry carcass and pivoted downwardly to engage viscera, eviscerates the poultry carcass.

3. The apparatus as recited in claim 1, wherein the cam track is continuous.

4. The apparatus as recited in claim 1, wherein the second conveyors travel in a plane that defines an acute angle to horizontal.

5. The apparatus as recited in claim 4, further comprising means for changing the angle of the second conveyors.

6. The apparatus as recited in claim 5, wherein the angle changing means comprises:
   a rotatable shaft connected to the frame; and
   means for rotating the shaft to pivot the frame and thereby change the angle of the plane of the second conveyors.

7. The apparatus as recited in claim 6, wherein the rotating means comprises at least one gear box having a handle to turn the gears which are operatively connected to the shaft.

8. The apparatus as recited in claim 1, further comprising means for changing the height of the frame.

9. The apparatus as recited in claim 8, wherein the height changing means comprises a jack attached to a frame member having an extendable piston for moving the frame vertically.

10. The apparatus as recited in claim 1, further comprising means for moving the frame laterally with respect to the first conveyor.

11. The apparatus as recited in claim 9, wherein the moving means comprises:
    a second frame having a pair of transverse spaced apart bars;
    a sliding member received on each of the bars and connected to the frame;
    a screw passing through a nut fixedly secured to the second frame; and
    means for rotating the screw,
    whereby rotating the screw moves the sliding blocks relative to the second frame.

12. A spoon operatively attached to a driver means for moving the spoon between a first position outside of the poultry carcass to a second position with the spoon partially entered into the poultry carcass for engaging and removal of viscera, comprising:
    a shaft having a bearing slidably mounted for travel between a shoulder of the shaft and a stop at one end of the shaft;
    a tube enclosing a spring that bears against the stop to bias the tube from the shaft and the tube press-fit connected to the bearing; and
    a spoon attached at a first end to the tube and having at least one tooth attached at an angle at a second end,
    whereby the spring-biased tube, being moved longitudinally on the shaft in response to the spoon contacting a distal end of the poultry carcass after entry of the tool for engaging and removal of viscera, prevents the spoon from pushing through the distal end.

13. A method of removing viscera from a poultry carcass carried substantially horizontally on a first conveyor, comprising:
    aligning the poultry carcass with a spoon module attached to a pair of continuous second conveyors driven by sprockets on a frame in synchronization with the travel of the first conveyor, the spoon module comprising a plate slidably attached to a pair of spaced-apart rods connected between the second conveyors;
    moving the plate transversely between the second conveyors on the pair of rods from a first position to a second position in response to a cam wheel traveling in a cam track to insert a spoon attached to the plate into the poultry carcass;
    pivoting the spoon downwardly to engage the viscera; and
    retracting the spoon from the second position to the first position by the cam wheel travelling in the cam track;
    whereby the viscera, being engaged by the spoon, is removed from the poultry carcass.

* * * * *